United States Patent [19]

Adams

[11] Patent Number: 4,493,092

[45] Date of Patent: Jan. 8, 1985

[54] INTERFACE CIRCUIT FOR DIGITAL SIGNAL TRANSMISSION SYSTEM

[75] Inventor: Tello D. Adams, Seminole, Fla.

[73] Assignee: GTE Automatic Electric, Inc., Northlake, Del.

[21] Appl. No.: 450,615

[22] Filed: Dec. 17, 1982

[51] Int. Cl.³ .............................................. H04L 5/14
[52] U.S. Cl. ..................................... 375/36; 307/270; 179/2 C
[58] Field of Search ............... 375/7, 17, 36; 307/270, 307/241, 443; 179/2 C, 2 DP; 370/80, 85

[56] References Cited

U.S. PATENT DOCUMENTS

| | | | |
|---|---|---|---|
| 3,585,399 | 6/1971 | Andrews, Jr. ........................ | 375/36 |
| 3,827,026 | 7/1974 | Viswanathan ........................ | 375/36 |
| 4,083,005 | 4/1978 | Looschen ............................. | 375/36 |
| 4,101,734 | 7/1978 | Dao ...................................... | 375/36 |
| 4,337,465 | 6/1982 | Spracken et al. ................... | 375/36 |

*Primary Examiner*—Robert L. Griffin
*Assistant Examiner*—Stephen Chin

[57] ABSTRACT

A signal transmission system which allows digital signals to be transmitted over twisted pair transmission lines. Master and slave transmission circuits are located at the switching system and terminal ends, respectively, of the transmission line. Both circuits include transmit and receive circuitry. The transmit circuitry includes a summing circuit connected to a constant current generator and the receive circuit includes a differential amplifier connected to a slicer circuit.

24 Claims, 3 Drawing Figures

INTERFACE CIRCUIT FOR DIGITAL SIGNAL TRANSMISSION SYSTEM

CROSS-REFERENCE TO RELATED APPLICATION

A copending and concurrently filed U.S. patent application, Ser. No. 450,616, is related to the present invention. That application is which is titled "Digital Signal Transmission System". The inventions claimed in both applications were invented by the same inventor and assigned to the same assignee.

FIELD OF THE INVENTION

The present invention relates to transmission systems and more particularly to a system for transmitting digital signals over analog, twisted pair transmission lines.

BACKGROUND OF THE INVENTION

For many years, it has been conventional practice to interconnect telephone instruments to central switching devices such as private automatic branch exchanges, key systems and the like by inexpensive twisted pair transmission lines. These transmission lines consist of two elongated insulated conductors which are twisted together along their lengths. The instruments and switching devices, until very recently, utilized low frequency analog signals typically in a frequency range of 0–4 KHZ. The twisted pair transmission lines were not only inexpensive and technically acceptable for transmitting such signals but they could also be installed and removed or replaced easily and inexpensively.

New telephone instruments and other types of equipment incorporating telephone functions, now referred to as terminals, as well as new central switching devices utilize digital rather than analog signals. However, the signal transmission parameters of twisted pair transmission lines are inadequate for digital signal transmission. If twisted pair transmission lines are used to transmit digital signals, excessive signal degradation results. Such signal degradation can be corrected by connecting expensive equipment to these lines, but twisted pair transmission lines are still unsuitable for general use in transmitting digital signals because of the high cost of such equipment.

When digital equipment is to be installed with new transmission facilities it is customary to use coaxial cables, rather than twisted pair transmission lines since coaxial cables have signal transmission parameters which are suited to transmitting digital signals. However, when twisted pair transmission lines have already been installed, expensive and time consuming replacement procedures are required to remove these lines and replace them with coaxial cables.

The present invention overcomes the requirement of such replacement procedure by providing new and inexpensive equipment which cooperates with a twisted pair transmission line in such manner that it can be used to transmit digital signals over extended distances, e.g. several miles, without causing appreciable signal degradation.

SUMMARY OF THE INVENTION

In accordance with the present invention, an interface circuit for digital signal transmission system is provided for use between first and second digital signaling devices. Each device is operative to provide digital device signals of first, second and third characteristics. The digital signal transmission system includes first and second line interface devices connected to the first and second digital signaling devices, respectively. It also includes a transmission line connected between the first and second line interface devices. The first and second line interface devices are both operative in response to the digital device signal of the first characteristic to provide bias current in the transmission line. Each line interface device is further operative in response to the digital device signals of the second and third characteristics to modulate the bias current with modulation signals of first and second characteristics, respectively.

Each of the line interface devices is further operative in response to the bias current to provide a digital interface signal of a first characteristic. Each line interface device is further operative in response to the modulation signals of the first and second characteristics to provide digital interface signals of second and third characteristics, respectively.

Each digital signaling device is further operative to receive the digital signals of first, second and third characteristics.

DESCRIPTION OF THE PREFERRED EMBODIMENT

Figure 1:
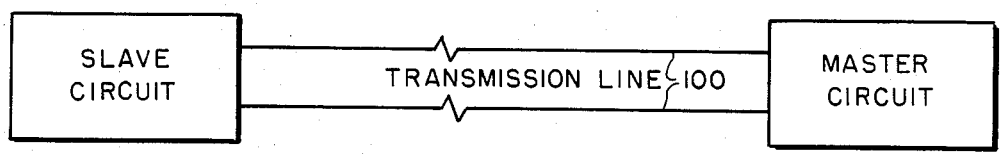
FIG. 1 of the accompanying drawing is a block diagram of the interface circuit for digital signal transmission system of the present invention.
Figure 2:
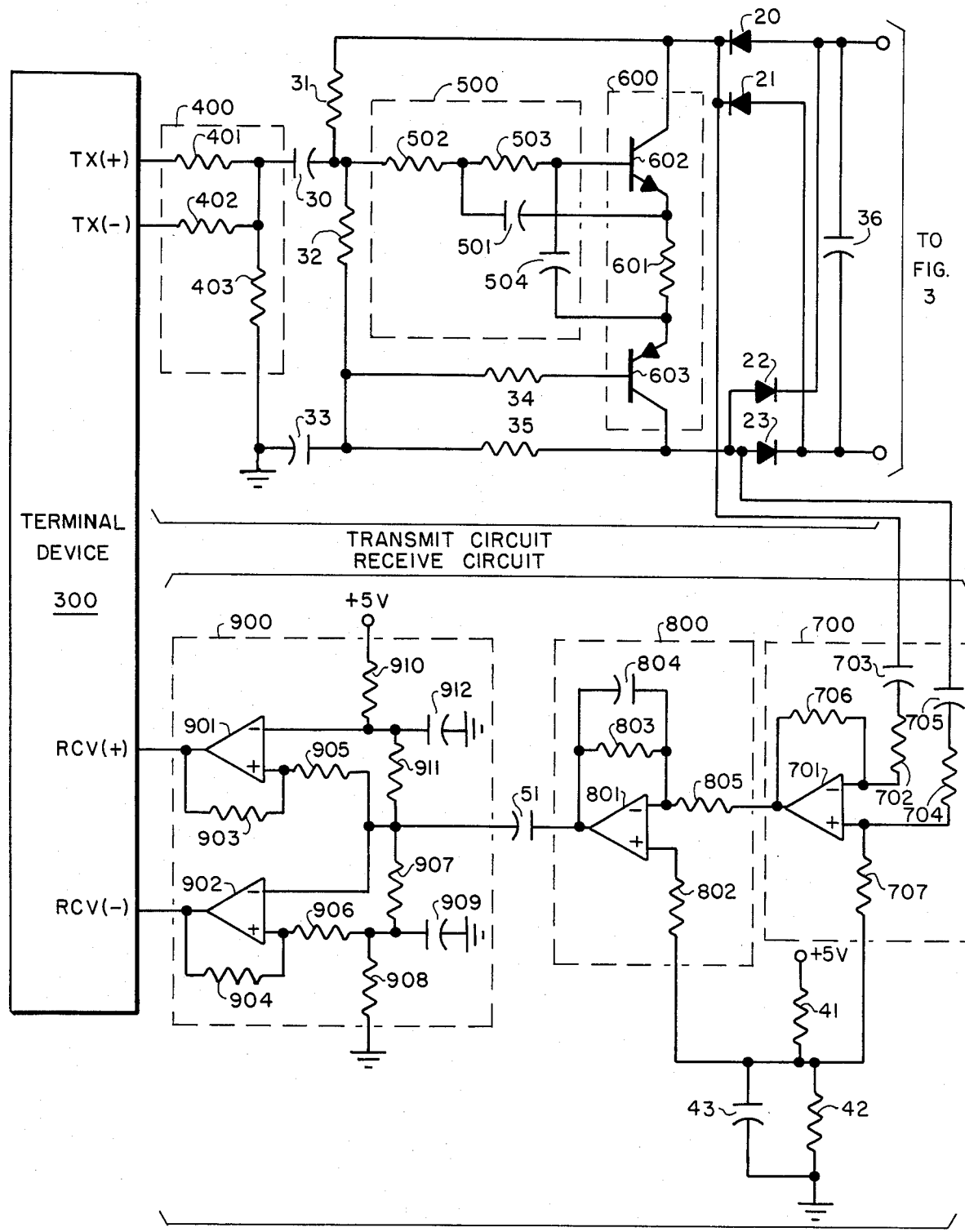
FIG. 2 of the accompanying drawing is a schematic diagram of the slave circuit shown in FIG. 1.
Figure 3:
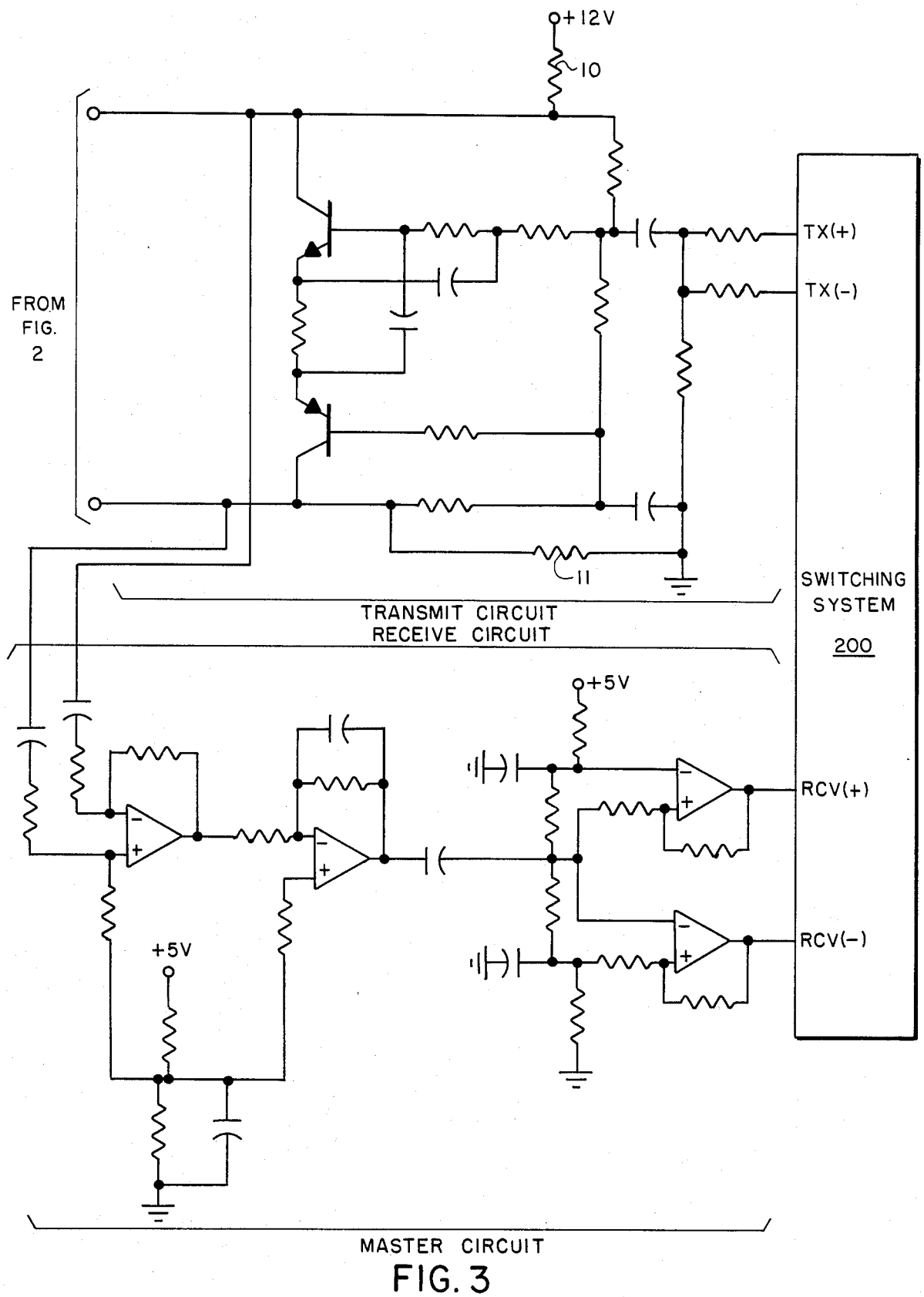
FIG. 3 of the accompanying drawing is a schematic diagram of the master circuit shown in FIG. 1.

Referring now to the accompanying drawing, the interface circuit for digital signal transmission system of the present invention is shown. This system includes a master circuit (first line interface device), connected between transmission line 100 having first and second wires, and switching system 200 (first digital signaling device). It also includes a slave circuit (second line interface device) connected between transmission line 100 and terminal device 300 (second digital signaling device). The master and slave circuits are identical except for power supply circuitry. The master circuit includes a 12 volt power supply and power and ground resistors 10 and 11, respectively. This circuitry does not exist in the slave circuit. However, the slave circuit includes diode bridge 20–23 (current directional means) which does not exist in the master circuit.

Both the master circuit and the slave circuit include transmit and receive circuits. While the circuitry of both the master and slave circuits is shown on the accompanying drawing, numerical references and operational descriptions are provided only for the transmit and receive circuits of the slave circuit. The slave transmit circuit includes summing circuit 400, filter 500, current generator 600 and resistor capacitor network 30–35. The slave receive circuit includes receiver 700, amplifier 800, slicer 900, voltage reference circuit 41–43 and capacitor 51.

Summing circuit 400 is connected between terminal device 300 and first coupling capacitor 30 which is connected to the junction of first and second bias resistors 31 and 32, respectively. Filter 500 is connected between capacitor 30 and balance current generator 600. Resistor 32 is connected to the junction of balancing resistor 34, second coupling capacitor 33 and third bias resistor 35. Capacitor 33 and summing circuit 400 are also connected to each other and to ground.

Summing circuit 400 includes resistors 401 and 402 connected to the positive and negative transmit, TX (+) and TX (−), terminals, respectively, of terminal device 300. These resistors are both further connected to summing resistor 403. Filter 500 includes capacitor 501 connected to the junction of resistors 502 and 503. Resistor 503 is also connected to capacitor 504. Current generator 600 includes regulatory resistor 601 connected between the emitters of first and second transistors, 602 and 603, respectively. These emitters are further connected to capacitors 501 and 504, respectively. The base of transistor 602 is connected to the junction of resistor 503 and capacitor 504, while the series combination of resistors 34 and 35 is connected across the base and collector of transistor 603. The collectors of these transistors are connected to diode bridge 20-23, capacitor 36 and transmission line 100.

Receiver 700 includes differential amplifier 701 which has positive (+) and negative (−) inputs. This receiver operates to reject common mode noise. The negative input is connected to the positive rectified side of transmission line 100 (junction of diode 20 and 21) via resistor 702 and capacitor 703. The positive input is connected to the negative rectified side of transmission line 100 via resistor 704 and capacitor 705. The negative input of amplifier 701 is further connected to the output of this amplifier via feedback resistor 706. The positive input of this amplifier is further connected, via resistor 707, to the junction of resistors 41 and 42 which are connected to a +5 volt power source and ground, respectively. Capacitor 43 is connected in parallel with resistor 42.

Amplifier 800 includes amplifier 801 which has positive (+) and negative (−) inputs. The positive input is connected to capacitor 43 via resistor 802 and the negative input is connected to the output of this amplifier via the parallel combination of resistor 803 and capacitor 804. The output of this amplifier is further connected to capacitor 51.

Slicer 900 includes positive and negative comparators 901 and 902, whose positive (+) inputs are connected to their associated outputs via first and second feedback resistors 903 and 904, respectively. The negative (−) input of comparator 902 is connected to isolation capacitor 51 and to resistor 905 which is connected to the positive input of comparator 901. The positive input of comparator 902 is connected via resistor 906 to the junction of capacitor 909 and resistors 907 and 908. The negative (−) input of comparator 901 is connected to the junction of capacitor 912 and resistors 910 and 911. Resistor 908 and capacitors 909 and 912 are further connected to ground while resistor 910 is further connected to the +5 volt power source. The outputs of comparators 901 and 902 are connected to the positive and negative receive, RCV (+) and RCV (−) terminals, respectively, of terminal device 300.

Since the master circuit is identical to the slave circuit, except for power circuitry, operation of the present invention is described with reference to the slave circuit. The 12 volt power supply provides power to both the master and slave circuits. This power flows to the slave circuit from the 12 volt supply via resistor 10 and transmission line 100. The current from this power supply is then returned to ground via transmission line 100 and resistor 11.

When terminal device 300 transmits data to switching system 200 (e.g. a telephone central office), it applies selected patterns of digital data bits (logic levels 1 and 0) to the positive, TX (+), and negative, TX (−), transmit terminals. Data is transmitted over transmission line 100 under a trilevel, alternate mark inversion (AMI) arrangement. Under this arrangement, there are three states of valid signals, positive, negative and zero. Since three signaling states are required to transmit data under this arrangement, terminal device 300 must apply two data bits to summing circuit 400, via the TX (+) and TX (−) terminals, to define each signal to be transmitted over transmission line 100. The relationship between the various data bit patterns, provided by terminal device 300, and the associated resultant signals, transmitted over transmission line 100, are listed in TABLE 1.

TABLE 1

| First Data Bit | Second Data Bit | Transmission Line Signal |
| --- | --- | --- |
| 1 | 0 | High (positive) |
| 0 | 0 | Zero |
| 0 | 1 | Low (negative) |

The combination of data bit signals which correspond to the High, Zero and Low transmission line signals, represent digital device signals of second, first and third characteristics, respectively. Also, the Zero, High and Low transmission line signals represent bias current, modulation signal of a first characteristic and modulation signal of a second characteristic, respectively. Similarly, corresponding combinations of receive signals are provided by the receive circuit in response to these Zero, High and Low level transmission line signals. These receive signals represent digital interface signals of first, second and third characteristics, and appear at the RCV (+) and RCV (−) terminals.

However, since the High, Zero and Low signals are represented by signals of successively decreasing magnitude, the data bits applied to the TX (+) and TX (−) terminals, when summed by summing circuit 400, must also be of successively decreasing magnitude. Therefore, the data bits to be applied to the TX (−) terminals are inverted before appearing at that lead. Accordingly, the actual data bits appearing at the TX (+) and TX (−) terminals and resultant transmission line signals are listed in TABLE 2.

TABLE 2

| TX (+) | TX (−) | Transmission Line Signal |
| --- | --- | --- |
| 1 | 1 | High |
| 0 | 1 | Zero |
| 0 | 0 | Low |

Bias or zero level current flows from the 12 volt power supply, through resistor 10, and transmission line 100. This current then flows to ground through the slave transmit circuit, transmission line 100 and resistor 11. Diode bridge 20-23 ensures that the bias signal is always of the polarity required for the slave transmit circuit to operate properly. Bias resistors 31, 32 and 35 provide bias current for current generator 600 and thereby control the transmission line bias current. Resistor 34 balances the impedance of filter 500 and thereby cancels any transmission line noise, that is coupled through the basecollector capacitances of transistors 601 and 602. For noise rejection and grounding purposes both the master and slave circuits must be isolated from the line. This is accomplished in the transmit circuits by transistors 602 and 603, and in the receive circuits by blocking capacitors 703 and 705.

The transmission technique used for these applications consists of modulated signals superimposed upon the bias current delivered to the load through resistors 10 and 11. When transmitting from switching system 200 the modulated current develops a differential voltage across resistors 10 and 11. This voltage is received by receiver 700 in the slave circuit. The use of a differential technique to both transmit and receive, over twisted pair, greatly enhances the signal-to-noise ratio as most noise pickup appears as a common mode signal. By using this technique line resistance has only a minor effect due to the high terminating impedance presented by transistors 602 and 603, and resistors 702 and 704. When transmitting from terminal device 300, the same type of modulation is used and a resultant voltage is again developed across resistors 10 and 11. This voltage is then detected by a receiver in the master circuit. Since the actual transmission vehicle is current, in one direction, and voltage into a very high impedance in the other direction the line resistance has little effect. The principal degradation, due to the transmission line, occurs at the higher frequencies and is caused by the transmission line's frequency response and group delay characteristics.

When terminal device 300 is transmitting, it provides various logic level 1 and 0 signals, as shown in Table 2, at its TX (+) and TX (−) terminals. These logic level 1 and 0 signals cause corresponding levels of current to flow through resistor 403 via resistors 401 and 402. The resultant voltage developed across resistor 403 varies in order to represent the various sums of the signals appearing at the TX (+) and TX (−) terminals. This variable resultant voltage represents first, second and third current control signals and corresponds to the digital device signals of first, second and third characteristics, respectively. This resultant voltage causes a corresponding current to flow through filter 500 via capacitor 30. Filter 500 limits the band width of the transmission line signal and minimizes electromagnetic interference. The extent to which this filter degrades (rounds off) the transmission line signal is determined by the data rate being used. At the 4 kilobit per second (KBS) rate the rounding effect is negligible. However, at higher frequencies, e.g. 25 KBS, there can be considerable rounding and distortion.

This filtered current from filter 500 is then applied to the base of transistor 602 in current generator 600. Since transistor 602 is connected to transistor 603, current flow in transistor 602 causes current to flow in transistor 603 also. These transistors, in combination with resistor 601, operate as a differential current generator since any variation in driver voltage causes a corresponding change in the voltage across resistor 601 and a proportial change in the current outputs of transistors 602 and 603.

Current generator 600 applies alternate-mark-inversion (AMI) signals to transmission line 100 by modulating the bias current flowing in the transmission line. When terminal device 300 provides logic level 0 and 1 signals (Zero transmission line signal) at the TX (+) and TX (−) terminals, respectively, those signals are summed, filtered and applied to current generator 600 which maintains the bias current in, and prevents any change in voltage drop across, transmission line 100. The level of this bias current is defined by resistors 31, 32 and 34 which control transistors 602 and 603. When terminal device 300 provides logic level 1 signals (High transmission line signal) at both the TX (+) and TX (−) terminals, current generator 600 modulates the bias current in transmission line 100 by increasing the level of such current. Similarly when terminal device 300 provides logic level 0 signals (Low transmission line signal) at both the TX (+) and TX (−) terminals, current generator 600 modulates the bias current in transmission line 100 by decreasing the level of such current.

When the bias level current flows in transmission line 100, the voltage drops across resistors 10 and 11 are equal. The voltages across these resistors are detected at the positive (+) and negative (−) inputs of receiver amplifier 701. Capacitors 703 and 705 block any direct current (DC) component of those voltages. Any common mode noise is thus rejected under this type of configuration of amplifier 701. Three output signals are provided by this amplifier. These receiver signals of first, second and third characteristics correspond to the Zero, High and Low transmission line signals. These signals are then applied to the negative input of amplifier 801 via resistor 805. Capacitor 804 and resistors 803 and 805 operate as a low pass filter to attenuate any high frequency noise, and thereby enhance the signal to noise ratio and lower the error rate. Resistors 41 and 42 and capacitor 43 provide a voltage reference level for amplifiers 701 and 801.

The amplified signal from amplifier 801 is then coupled to slicer 900 via capacitor 51. This capacitor blocks DC voltage and thereby causes the amplified receiver signal to be referenced to the DC voltage appearing at the junction of resistors 907 and 911. Thus the center point of the amplified receiver signal is defined by voltage divider resistors 910, 911, 907 and 908, and the voltage appearing at the junction of resistors 907 and 911 provides a reference about which the amplitude of the amplified receiver signal varies. Comparators 901 and 902 slice the amplified receiver signal by comparing it to predetermined reference voltages. The reference voltage for comparator 901 is defined by resistors 910 and 911, as filtered by capacitor 912. The reference voltage for comparator 902 is defined by resistors 907 and 908, as filtered by capacitor 909.

When the signal appearing at the positive (+) input of comparator 901 exceeds the reference voltage appearing at its negative (−) input, a logic level 1 signal appears at the output of comparator 901. Similarly, when the signal appearing at the negative (−) input of comparator 902 is less than the reference voltage appearing at its positive (+) input, a logic level 1 signal appears at the output of comparator 902. These logic level 1 first and second comparator signals, and the absence of both signals, represent digital interface signals of second, third and first characteristics which correspond to the high, low and zero transmission line signals, respectively. Resistors 903 and 904 provide the hysteresis necessary to limit false or multiple output signals due to any noise that is not attenuated by the filter connected to amplifier 801.

Thus the interface circuit for digital signal transmission system of the present invention allows digital signals to be transmitted over a twisted pair transmission line through use of a differential current generator and receiver located at both ends of the line.

It will be obvious to those skilled in the art that numerous modifications of the present invention can be made without departing from the spirit of the invention which shall be limited only by the scope of the claims appended hereto.

What is claimed is:

1. An interface circuit for digital signal transmission system for use between first and second digital signaling devices, each device being operative to provide digital device signals of first, second and third characteristics, said digital signal transmission system comprising:
    first and second line interface devices connected to said first and second digital signaling devices, respectively;
    a transmission line connected between said first and second line interface devices;
    each of said first and second line interface devices being operative in response to said digital device signal of said first characteristic to provide bias current in said transmission line; and each being further operative in response to said digital device signals of said second and third characteristics to modulate said bias current with modulation signals of first and second characteristics, respectively; and each of said first and second line interface devices being further operative in response to said bias current to provide a digital interface signal of a first characteristic and each being further operative in response to said modulation signals of said first and second characteristics to provide digital interface signals of second and third characteristics, respectively; said digital signaling devices each being further operative to receive said digital interface signals of said first, second and third characteristics.

2. A digital signaling interface circuit as claimed in claim 1, wherein said first and second line interface devices comprise:
    first and second transmitting means, respectively, each connected between said transmission line and said associated digital signaling device, and both operative in response to said digital device signal of said first characteristic to provide said transmission line bias current, and each further operative in response to said digital device signals of said second and third characteristics to provide said modulation signals of said first and second characteristics, respectively.

3. A digital signaling interface circuit as claimed in claim 1, wherein said first and second line interface devices comprise:
    first and second receiving means, respectively, each connected between said transmission line and said associated digital signaling device, and each operative in response to said bias current to provide said digital interface signal of said first characteristic, and each further operative in response to said modulation signals of said first and second characteristics to provide said digital interface signals of said second and third characteristics, respectively.

4. A digital signaling interface circuit as claimed in claim 1, wherein said first line interface device comprises a source of power for said transmission line bias current and said modulation signals of first and second characteristics.

5. A digital signaling interface circuit as claimed in claim 1, wherein said second line interface device comprises current directional means being operative to cause said transmission line bias current to be unidirectional within said second line interface device.

6. A digital signaling interface circuit as claimed in claim 2, wherein said first transmitting means comprises a source of power for said transmission line bias current and said first and second modulation signals.

7. A digital signaling interface circuit as claimed in claim 2, wherein said second transmitting means comprises current directional means being operative to cause said transmission line bias current to be unidirectional within said second transmitting means.

8. A digital signaling interface circuit as claimed in claim 7, wherein said current directional means comprises a diode bridge.

9. A digital signaling interface circuit as claimed in claim 2, wherein said digital device signals of said first, second and third characteristics, are each represented by a plurality of different digital data bits, said first and second transmitting means each comprising:
    summing means connected to said first and second digital signal devices, respectively, and operative in response to said plurality of data bits representing said digital device signals of said first, second and third characteristics to provide first, second and third current control signals respectively; and
    current generating means connected to said summing means and operative in response to said first, second and third current control signals to provide said transmission line bias current and said modulation signals of said first and second characteristics, respectively.

10. A digital signaling interface circuit as claimed in claim 9, wherein there is further included: filter means connected between said summing means and said current generating means and operative to filter said current control signals of said first, second and third characteristics; said current generating means being operative in response to said filtered current control signals of said first, second and third characteristics to provide said transmission line bias current and said modulation signals of said first and second characteristics, respectively.

11. A digital signaling interface circuit as claimed in claim 9, wherein said summing means comprises:
    first and second resistors connected to a common junction and to said digital signaling device; and
    a third resistor connected between said common junction and ground.

12. A digital signaling interface circuit as claimed in claim 9, wherein said current generating means comprises a transistor connected to a resistor.

13. A digital signaling interface circuit as claimed in claim 9, wherein said transmission line includes first and second wires, said current generating means comprising:
    a regulatory resistor;
    first and second transistors each having base, collector and oppositely poled emitters; said collectors of said first and second transistors being connected to said first and second wires, respectively, said regulating resistor being connected between said first and second emitters; a first bias resistor connected across said first base and first collector; a second bias resistor connected between said first and second bases; and a third bias resistor connected across said second base and collector; said second and third bias resistors being further connected to a common junction.

14. A digital signaling interface circuit as claimed in claim 10, wherein there is further included: a first signal coupling capacitor connected between said filter means and said summing means.

15. A digital signaling interface circuit as claimed in claim 13, wherein there is further included a second signal coupling capacitor connected between ground and said junction between said second and third bias resistors.

16. A digital signaling interface circuit as claimed in claim 13, wherein there is further included, an impedance balancing resistor connected between said second base and said junction between said second and third bias resistors.

17. A digital signaling interface circuit as claimed in claim 3, wherein said receiving means comprises:
   a common mode noise rejection receiver connected to said transmission line and operative in response to said transmission line bias current and said modulation signals of said first and second characteristics to provide receiver signals of first, second and third characteristics, respectively; and
   signal slicing means having an input lead connected to said common mode noise rejection receiver and a pair of slicer outputs connected to said digital signaling device, said slicing means being operative in response to said receiver signals of first, second and third characteristics to provide said digital interface signals of first, second and third characteristics, respectively.

18. A digital signaling interface circuit as claimed in claim 17, wherein there is further included, an amplifier connected between said common mode noise rejection receiver and said signal slicing means, and operative to amplify said receiver signals.

19. A digital signaling interface circuit as claimed in claim 18, wherein there is further included, a voltage reference source, said amplifier comprising:
   an operational amplifier having positive and negative inputs and a receiver output, said negative input being connected to said common mode noise rejection receiver, and said positive input being connected to said voltage reference source; and
   a filter connected across said negative input and said receiver output.

20. A digital signaling interface circuit as claimed in claim 17, wherein said transmission line includes first and second wires, said digital signaling system further including, a voltage reference source, said common mode noise rejection receiver comprising:
   a differential amplifier having positive and negative inputs and an output; a first blocking capacitor connected between said negative input and said first wire;
   a second blocking capacitor connected between said positive input and said second wire;
   a feedback resistor connected between said negative input and said output; and said positive input connected to said voltage reference source.

21. A digital signaling interface circuit as claimed in claim 17, wherein there is further included sources of first and second reference voltages, said signal slicing means comprising:
   first and second comparators each having first and second inputs, said second input of said first comparator connected to said first input of said second comparator and to said common mode noise rejection receiver;
   said first input of said first comparator and said second input of said second comparator being connected to said first and second source of said reference voltages, respectively;
   said first comparator being operative to provide a first comparator signal when said receiver signal exceeds said first reference voltage, said second comparator being operative to provide a second comparator signal when said receiver signal is less than said second reference voltage;
   whereby said digital interface signals of first, second and third characteristics are represented by said first comparator signal, said second comparator signal, and an absence of said first and second comparator signals, respectively.

22. A digital signaling interface circuit as claimed in claim 21, wherein: there is further included, first and second feedback resistors connected across the output and second input of each comparator.

23. A digital signaling interface circuit as claimed in claim 17, wherein there is a voltage reference isolation capacitor connected between said common mode noise rejection receiver and said signal slicing means.

24. A digital signaling interface circuit as claimed in claim 13, wherein said filter means comprises first and second series connected filter resistors connected between said first coupling capacitor and the base of said first transistor;
   a first capacitor connected between the emitter of said first transistor and the junction of said first and second filter resistors; and
   a second capacitor connected between the base of said first transistor and the emitter of said second transistor.

* * * * *